United States Patent [19]

Nishikawa et al.

[11] 3,854,560
[45] Dec. 17, 1974

[54] LATCH OPERATED CLUTCH

[75] Inventors: Tatsuo Nishikawa; Toshiaki Ozawa, both of Tokyo, Japan

[73] Assignee: Canon Kabushiki Kaisha, Tokyo, Japan

[22] Filed: Apr. 12, 1973

[21] Appl. No.: 350,647

[30] Foreign Application Priority Data
Apr. 19, 1972 Japan.................................. 47-38683

[52] U.S. Cl.................................. 192/27, 74/125.5
[51] Int. Cl....................... F16d 41/02, F16d 15/00
[58] Field of Search...................... 192/27, 33 R, 38; 74/125.5

[56] References Cited
UNITED STATES PATENTS

| | | | |
|---|---|---|---|
| 923,857 | 6/1909 | Kettering | 192/27 |
| 2,140,737 | 12/1938 | Dickens | 192/27 |
| 2,644,560 | 7/1953 | Kleinschmidt | 192/27 |

*Primary Examiner*—Allan D. Herrmann
*Attorney, Agent, or Firm*—Fitzpatrick, Cella, Harper & Scinto

[57] ABSTRACT

A rotational force transmission device is disclosed, in which even if a driving wheel is continuously rotated, the driven wheel is capable of intermittent motion. The device provides hardened rollers instead of springs so that said rollers are forcibly isolated from the driving wheel when the rotating force is not being transmitted.

8 Claims, 8 Drawing Figures

LATCH OPERATED CLUTCH

BACKGROUND OF THE INVENTION

1. Field of the Invention

This invention is directed to the field of rotational force transmission devices and principally to an improved rotational force transmission device which offers a construction such that even if a driving wheel is continuously rotated, the driven wheel is capable of intermittent motion, along with the provision of a high degree of durability and resistance to wear.

2. Description of the Prior Art

Most prior art devices employ a spring-clutch system as disclosed in U.S. Pat. Nos. 2,229,283, 2,544,996, 2,664,183, 3,247,727 and the like. However, springs, rollers or balls incorporated into said system become easily worn since they are placed in contact with rotating members or the like even when rotational force is not being transmitted, and, in addition, it lacked reliability as it was difficult for a spring to slip on the shaft or wedge-like cut.

SUMMARY OF THE INVENTION

It is therefore a primary object of this invention to provide an improved rotational force transmission device overcoming the aforesaid disadvantages.

Another object of this invention is to provide a rotational force transmission device which does not use springs that are prone to wear, but uses hardened-treated rollers which are forcibly isolated from the driving wheel when not in engagement, i.e. when a rotational force is not being transmitted, to thereby increase the durability of the rollers.

It is a further object of the invention to provide a rotational force transmission device which is small in size, inexpensive, and accurate in operation.

Other features of the invention will be apparent from the following detailed description when read in conjunction with the accompanying drawings.

DESCRIPTION OF THE PREFERRED EMBODIMENTS

Figure 3:
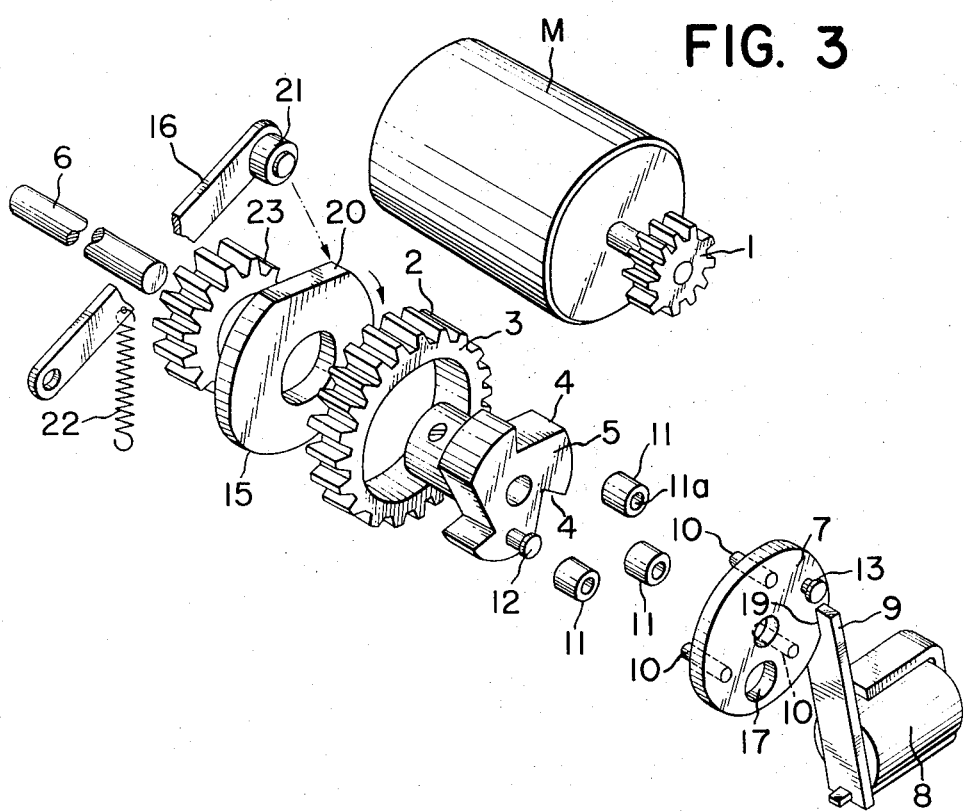
FIG. 3 is an exploded view of the whole device according to this invention.

An outline of the device according to this invention will now be described with reference to FIG. 3. In the drawing, M denotes a small motor which normally rotates continuously, and a rotational force transmission gear 1 is mounted on a rotary shaft. The rotational force of the gear 1 is transmitted through an intermediate gear (not shown) to teeth 2 of a main rotary body 3 to cause said body 3 to be normally, continuously rotated. A driven body 5 is rotatably fitted in said rotary body 3 together with a shaft 6. The driven body 5 and shaft 6 are integrally secured by means of a screw not shown. Integrally mounted on the shaft 6, for the driven body 5, are a cam plate 15 and a transmission gear 23.

Figure 4A:
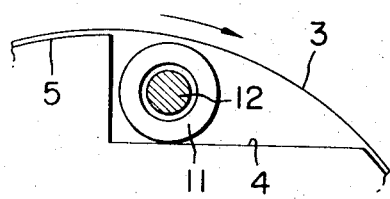
FIGS. 4 (A) and 4 (B) are views explaining the function of the rollers for a clutch.
Figure 4B:
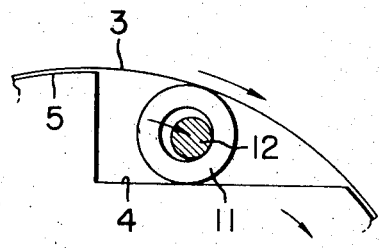

The driven body 5 is provided, in the peripheral surface thereof, with a required number of cuts 4, and a pin 12 is mounted on the front surface of the body. Numerals 11 denote perforated rollers having hollow portions 11a which are arranged in the cuts 4 of the driven body 5, said rollers being movable within wedge-like spaces formed by the inner peripheral surface of the main rotary body 3 and the cut 4 of the driven body 5. As shown in FIGS. 4 (A) and 4 (B), the roller 11, when positioned as shown in FIG. 4 (A), is not placed in contact with the inner peripheral surface of the main rotary body 3 so that the rotational force of the main rotary body 3 is not transmitted to the driven body 5. Further, the roller 11 does not become worn since it is not in contact with a member which constantly rotates. When the roller 11 moves towards a wedge-like narrow portion as shown in FIG. 4 (B), the inner peripheral surface of the main rotary body 3 is brought into frictional engagement with the outer peripheral surface of the roller 11, causing the driven body 5 to be rotated following the rotation of the main rotary body 3. Therefore, when the rotational force of the main rotary body 3 is not transmitted, the roller 11 does not become worn, thereby increasing the durability of the clutch mechanism. Pins 10 secured to a shift disc 7 are fitted into the hollow portions 11a of the rollers 11 to move the rollers 11. The shift disc 7 is rotatably fitted on the shaft 6 and the rotation of the shift disc 7 causes the rollers 11 to move into the cuts 4. A pin 12, secured to the driven body 5 passes through a hole 17 made in the shift disc 7 and a spring 14 is connected between said pin 12 and a pin 13 secured to the disc 7. In this condition therefore, the disc 7 is urged to be rotated in a clockwise direction and the rollers 11 are also caused to be rotated in a clockwise direction by means of the pins 10 secured to the disc 7. On the other hand, the driven body 5 is urged to be rotated in a counterclockwise direction by means of the pin 12 so that the rollers 11 are pressed towards the wedge-like narrow portions formed by the inner peripheral surface of the main rotary body 3 and the cut 4 of the driven body 5 to make frictional engagement. Dimensions and shapes of respective constructions are so determined that a center point of the pin 12 is positioned near the center point of the hole 17 so as not to bring the outer peripheral surface of the pin 12 in contact with the inner peripheral surface of the hole 17. In this way, the engaging force of the clutch mechanism can be maintained in its optimum condition.

Figure 1:
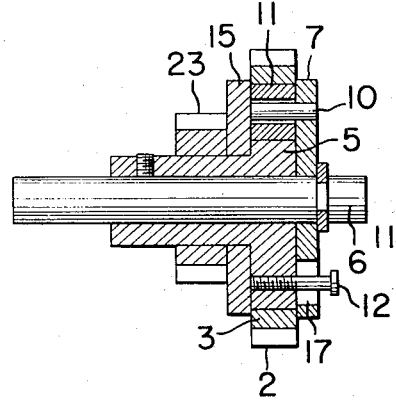
FIG. 1 is a longitudinal sectional view of the main part of the device according to this invention.
Figure 2:
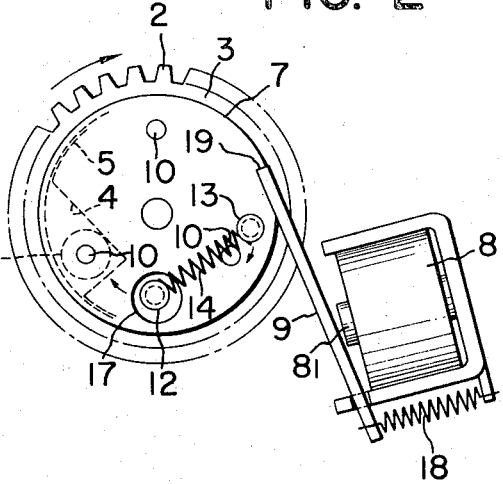
FIG. 2 is a right side view of the device in FIG. 1.

In such an engaging condition as above mentioned, a spring 22 is mounted so that roller 21 of a clutch release lever 16 presses the right end of a plane portion 20 provided on the cam plate 15 for a purpose that will be described more fully hereinafter. An armature 9 of an electromagnetic solenoid 8 releasably engages a cut 19 in the shift disc 7, and when no signal current is applied to the electromagnetic solenoid 8, the armature 9 is drawn by the spring 18, causing the shift disc 7 to be secured as shown in FIG. 2. The optimum position in the cut 19 of the shift disc 7 is preferably arranged so that the driven body 5 is rotated in a clockwise direction by the pressing force of the clutch release lever 16, and the outer peripheral surface of the pin 12 of the rotary body 5 is brought into contact with the outer peripheral surface of the hole 17 of the shift disc 7. At this time, the roller 11 is not in contact with the inner peripheral surface of the main rotary body 3, i.e. out of frictional engagement, and the clutch mechanism is released. Accordingly, the rotational force is not transmitted from the constantly rotating main rotary body 3 to the driven body 5, and the roller 11 does not receive wear.

When a pulse voltage is applied to the solenoid 8, the armature 9 is attracted by an iron core $8_1$ to release the shift disc 7. The shift disc 7 is drawn by the spring 14 and rotated in a clockwise direction causing the roller 11 to move into the narrow wedge-like space in the cut 4 through the pin 10 as shown in FIG. 4 (B), and the main rotary body 3 and the driven body 5 are brought into engagement through the roller 11, causing the driven body 5, shaft 6 and the like to integrally rotate, and power is transmitted from the gear 23.

When the pulse voltage is cut off from the solenoid 8, the armature 9 slips on the peripheral surface of the rotating shift disc 7 to engage with the cut 19 causing the shift disc 7 to rapidly stop. The driven body 5, cam plate 15, and the like, further rotate slightly due to the force of inertia, and during that time the roller 21 of the release lever 16 meets the plane portion 20 of cam to cause the driven body 5 to rapidly rotate in a clockwise direction and to cause the roller 11 to be positioned in the deep space portion of the cut 4 to release the clutch engagement.

A shorter release time may be effected by providing several cuts 19 in the periphery of the shift disc 7 and several plane portions 20 in the cam plate 15 while the signal voltage and solenoid characteristic are selected formed so as to apply or cut off the pulse voltage to the solenoid 8 within the rotating time between adjoining intervals of the cuts 19.

Various devices employ a winding spring clutch, as an intermittent transmission clutch, because of its small size and accurate operation, but said winding spring clutch is large in abraded quantity and short in life since the coil spring is wound round the boss of the constantly rotating main rotary body. According to the rotational force transmission device of the present invention, hardened rollers 11 are used for the clutch mechanism and, therefore, there is no rotation thereof when the clutch is disconnected, and even if rotation is initiated by contact with the main rotary body 3, there is no fear of wear. This results in the provision of durable and accurate operation.

Figure 5:
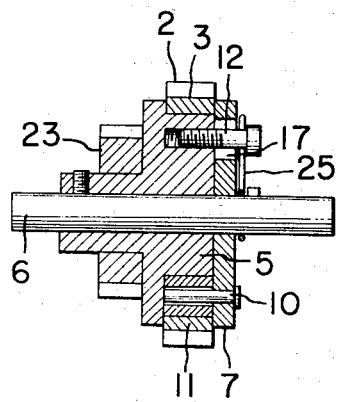
FIGS. 5 to 7 show other modes of the embodiment of FIG. 2.
Figure 7:
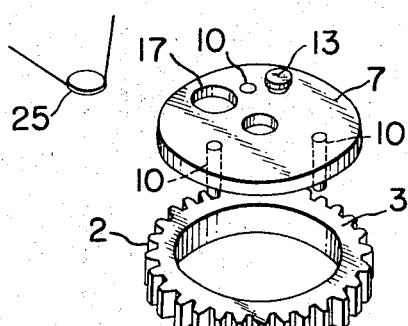
Figure 6:
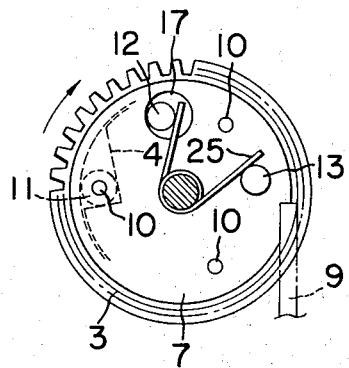
Figure 6:
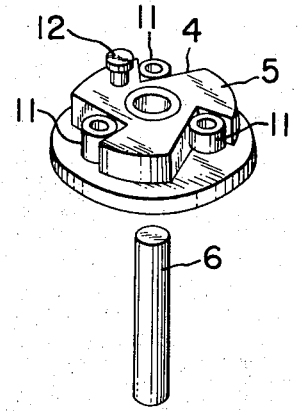

FIGS. 5 to 7 illustrate other embodiments of the invention. Similar elements are given similar reference characters in each of the respective drawings. In these embodiments, a spring 25 is used in place of the spring 14 shown in FIG. 2, as previously described. This spring 25 causes the pin 12 and the roller 11 to rotate in a clockwise direction and the pin 12 and the driven body 15 to rotate in a counterclockwise direction so that the main rotary body 3 is brought into contact with the driven body 5 to transmit the rotational force.

As described above, the device of the present invention is so constructed that the urging member for pressing the roller 11 in the engaging direction is not provided within the cut 4, but such urging is effected by using the pins 10 and 12 of the outside shift disc 7 so that it is possible to mount it without considering friction or the like between a member having a powerful engaging force and another member, and in addition, the intermittent rotation can be accurately and smoothly effected in a simple construction by controlling the shift disc 7. Moreover, this invention provides a device in which clutch engaging and releasing means can be easily mounted in such a manner that the aforesaid engaging force effected from the outside, and the wear of the rollers 11, possibly produced when the rotational force is not transmitted, can be prevented by the provision of a simple construction, comprising the lever 16, cam 15 and its plane portion 20, and the like, as shown in FIG. 3.

We claim:

1. A latch operated clutch comprising, a continuously rotating cylindrical main rotary member, a follower rotary member loosely fitted in said main rotary member, said follower rotary member being provided with at least one cut-away portion in the peripheral surface thereof, a roller disposed in said cut-away portion, a disc having mounted thereon a first supporting means for said roller, a second supporting means mounted on the front surface of said follower rotary member, said disc being provided with an opening at a position corresponding to said second supporting means, a third supporting means mounted on the front surface of said disc, biasing means extended between said second and third supporting means for biasing said follower rotary member and said disc in respectively opposite rotational directions so that said follower rotary member and said roller are in engagement, releasing means for releasing the engagement between said follower rotary member and said roller when in a non-transmission mode, stopping means for stopping the rotation of said disc, and control means for controlling said stopping means for converting a continuous rotation of said main rotary member into an intermittent rotation of said follower rotary member.

2. A clutch according to claim 1, wherein said releasing means comprises a cam plate integrally provided with said follower rotary member and having at least one flat portion, a lever member having one end thereof adapted to press against said flat portion, and spring means for biasing said lever member.

3. A clutch according to claim 2, wherein a plurality of said flat portions are provided corresponding to the number of desired intermittence.

4. A clutch according to claim 1, wherein said stopping means comprises a notched portion provided in said disc and a lever engageable with said notched portion, and said controlling means comprises an electromagnetic solenoid for controlling said lever.

5. A clutch according to claim 4, wherein a plurality of said notched portions are provided corresponding to the number of desired intermittence.

6. A clutch according to claim 1, wherein said biasing means comprises a coil spring.

7. A clutch according to claim 1, wherein said biasing means comprises a wind spring.

8. A clutch according to claim 1, wherein said second supporting means comprises a pin-like projection, the diameter of which is smaller than the diameter of the opening provided in said disc for permitting said pin-like projection to move within said opening.

* * * * *

UNITED STATES PATENT OFFICE
CERTIFICATE OF CORRECTION

Patent No. 3,854,560           Dated December 17, 1974

Inventor(s)   TATSUO NISHIKAWA and TOSHIAKI OZAWA

It is certified that error appears in the above-identified patent and that said Letters Patent are hereby corrected as shown below:

In the title page, Column 1, add additional claim to priority as follows:

-- April 19, 1972     Japan     U.M. 45615/1972 --

Column 2, line 60, "in the cut" should read --of the cut--;

Column 2, line 60, "of the shift disc" should read --in the shift disc--;

Column 3, line 31, delete "formed".

Signed and sealed this 1st day of April 1975.

(SEAL)
Attest:

RUTH C. MASON
Attesting Officer

C. MARSHALL DANN
Commissioner of Patents
and Trademarks